United States Patent
Vemulapati et al.

(10) Patent No.: US 11,458,887 B2
(45) Date of Patent: Oct. 4, 2022

(54) REFLECTIVE LAMP ASSEMBLY FOR A VEHICLE

(71) Applicant: Ford Global Technologies, LLC, Dearborn, MI (US)

(72) Inventors: Satyanarayana Raju Vemulapati, Westland, MI (US); Juergen Koehler, Cologne (DE); Michael Shawn Watterworth, Brighton, MI (US); Bhavani Thota, Novi, MI (US); Linh Ngoc Doan, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 16/989,997

(22) Filed: Aug. 11, 2020

(65) Prior Publication Data

US 2022/0048428 A1   Feb. 17, 2022

(51) Int. Cl.
*B60Q 1/26* (2006.01)
*B60Q 3/30* (2017.01)

(52) U.S. Cl.
CPC ............. *B60Q 1/2692* (2013.01); *B60Q 3/30* (2017.02)

(58) Field of Classification Search
CPC ........... B60Q 3/30; B60Q 1/2692; B60Q 1/30
See application file for complete search history.

(56) References Cited

U.S. PATENT DOCUMENTS

| | | |
|---|---|---|
| 4,896,136 A | 1/1990 | Hotovy |
| 5,184,888 A | 2/1993 | Sakuma |
| 6,485,081 B1 | 11/2002 | Bingle |
| 7,834,750 B1 | 11/2010 | Hertz |
| 8,425,094 B2 | 4/2013 | Stakoe |

FOREIGN PATENT DOCUMENTS

| | | | | |
|---|---|---|---|---|
| EP | 0637526 A2 | 2/1995 | | |
| WO | WO-9920936 A2 * | 4/1999 | ........... | B60Q 1/2665 |

* cited by examiner

*Primary Examiner* — Anabel Ton
(74) *Attorney, Agent, or Firm* — Vichit Chea; Price Heneveld LLP

(57) ABSTRACT

A vehicle includes a lift gate that is operable between a closed position and an open position, and a lamp assembly. The lamp assembly includes a housing coupled to the lift gate and having a backing with a reflective surface, a light source that is coupled to the housing and configured to emit light, and a lid that is operably coupled to the housing. The lid includes a reflective interior surface and reflective exterior surface that is opposite the reflective interior surface. The lid is operable between an open position, wherein the reflective surface of the backing is exposed, and a closed position.

19 Claims, 6 Drawing Sheets

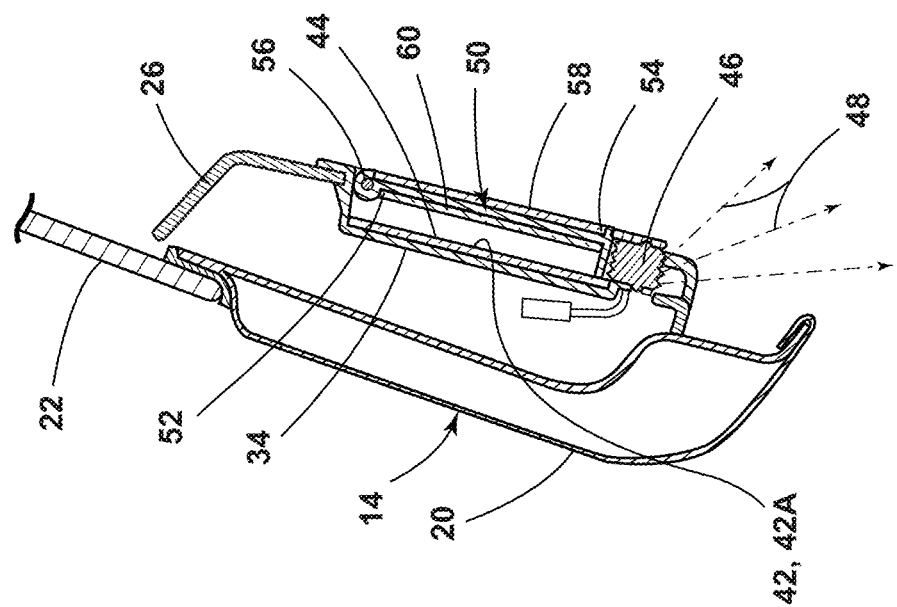
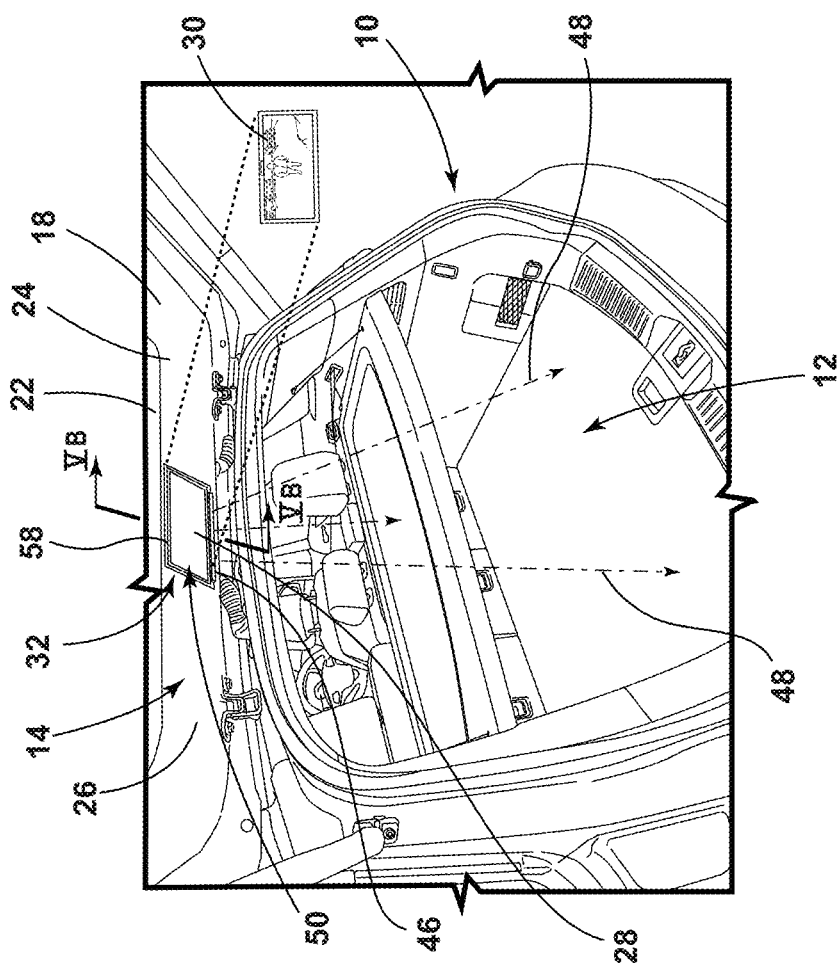
FIG. 5B
FIG. 5A

REFLECTIVE LAMP ASSEMBLY FOR A VEHICLE

FIELD OF THE DISCLOSURE

The present disclosure generally relates to a reflective assembly for a vehicle. More specifically, the present disclosure relates to a lamp assembly coupled to a lift gate of the vehicle and having a reflective portion configured to reflect a rear vehicle scene if the lift gate is in an open position.

BACKGROUND OF THE DISCLOSURE

A vehicle lift gate often includes a plurality of lights disposed on an exterior side of the lift gate. In an open position of the lift gate, the plurality of lights may emit light in an upward direction away from a cargo area and rear surroundings of the vehicle. A person facing the cargo area from outside of the vehicle may desire to see what is happening behind them. A lamp assembly that is configured to illuminate the cargo area and the rear vehicle surroundings and that is further configured to reflect an image of a rear vehicle scene may be desired.

SUMMARY OF THE DISCLOSURE

According to a first aspect of the present disclosure, a vehicle includes a lift gate operable between a closed position and an open position. A lamp assembly includes a housing that is coupled to the lift gate. The housing includes a backing with a reflective surface. A light source is coupled to the housing and is configured to emit light. A lid is operably coupled to the housing and includes a reflective interior surface and a reflective exterior surface opposite the reflective interior surface. The lid is operable between an open position, wherein the reflective surface of the backing is exposed, and a closed position.

Embodiments of the first aspect of the present disclosure may include any one or a combination of the following features:
- the reflective exterior surface of the lid faces generally vehicle-rearward and is configured to reflect a rear vehicle scene if the lift gate is in the open position and the lid is in the closed position;
- the reflective surface of the backing faces generally vehicle-rearward and is configured to reflect a rear vehicle scene if the lift gate is in the open position and the lid is in the open position;
- the reflective interior surface of the lid faces the reflective surface of the backing if the lid is in the closed position;
- the reflective interior surface of the lid is configured to reflect the light emitted from the light source generally vehicle-downward if the lift gate is in the open position and the lid is in the open position;
- the lid is pivotably coupled to the housing and configured to pivot about a lid pivot axis between the open and closed positions;
- a detent feature operably coupled to the lid and configured to retain the lid in one or more intermediate pivoted positions between the open position and the closed position;
- the reflective interior surface of the lid is configured to reflect the light emitted from the light source in a first direction if the lift gate is in the open position and the lid is in the one or more intermediate pivoted positions, and the reflective interior surface of the lid is configured to reflect the light emitted from the light source in a second direction vehicle-rearward of the first direction if the lift gate is in the open position and the lid is in the open position;
- the lift gate includes an interior side and an exterior side opposite the interior side, wherein the lamp assembly is coupled to the interior side of the lift gate; and
- the lift gate includes a window, wherein the housing is disposed vehicle-upward of the window if the lift gate is in the closed position.

According to a second aspect of the present disclosure, a lamp assembly for a vehicle includes a housing coupled to the vehicle and having a backing with a reflective surface. A light source is coupled to the housing and is configured to emit light. A lid is operably coupled to the housing and includes a reflective interior surface and a reflective exterior surface opposite the reflective interior surface. The lid is operable between an open position, wherein the reflective surface of the backing is exposed, and a closed position.

Embodiments of the second aspect of the present disclosure may include any one or a combination of the following features:
- the lid is pivotably coupled to the housing and configured to pivot about a lid pivot axis between the open and closed positions;
- the reflective surface of the backing is planar;
- the reflective exterior surface of the lid is planar and the reflective surface of the backing is parallel to the reflective exterior surface of the lid if the lid is in the closed position;
- the reflective interior surface of the lid is configured to reflect light emitted from the light source if the lid is in the open position; and
- the lid is pivotably coupled to the housing proximate a first end of the lid, and the lid extends from the first end to a second end that is distal from the first end, wherein the second end is proximate to the light source in the closed position of the lid.

According to a third aspect of the present disclosure, a vehicle includes a lift gate operable between a closed position and an open position. A reflective panel is coupled to the lift gate and is operable to reflect a rear vehicle scene if the lift gate is in the open position.

Embodiments of the third aspect of the present disclosure may include any one or a combination of the following features:
- the lift gate includes a window, wherein the reflective panel is disposed vehicle-upward of the window if the lift gate is in the closed position;
- the reflective panel faces generally vehicle-downward if the lift gate is in the closed position; and
- the reflective panel is operable to pivot relative to the lift gate about a lid pivot axis.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 5A is a perspective view of a rear portion of the vehicle, illustrating the lift gate in the open position and the lamp assembly coupled to the lift gate with the lid in the closed position, such that the reflective exterior surface of the lid is reflecting a rear vehicle scene, according to one embodiment;

FIG. 5B is a cross-sectional view taken through line VB-VB, illustrating the lamp assembly coupled to the lift gate with the lid in the closed position, according to one embodiment;

DETAILED DESCRIPTION OF THE PREFERRED EMBODIMENTS

Figure 1:
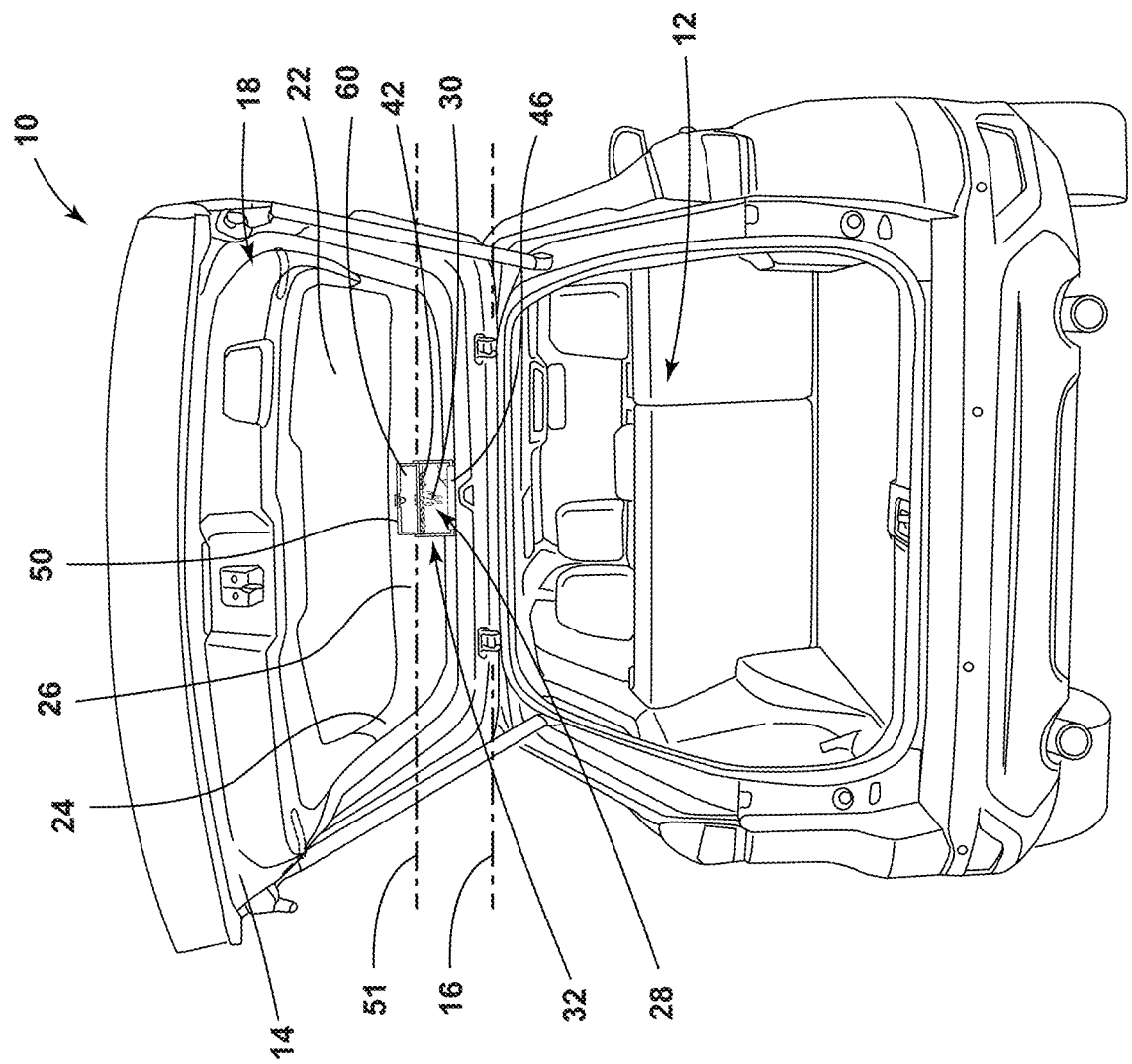
FIG. 1 is a perspective view of a vehicle, illustrating a lift gate in an open position and a lamp assembly coupled to the lift gate, according to one embodiment.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As illustrated in FIGS. 1-6B, a vehicle 10 includes a lift gate 14 that is operable between a closed position and an open position. A lamp assembly 32 may include a housing 34 coupled to the lift gate 14 and having a backing 42 with a reflective surface 42A, a light source 46 that is coupled to the housing 34 and is configured to emit light 48, and a lid 50 that is operably coupled to the housing 34. The lid 50 may include a reflective interior surface 60 and a reflective exterior surface 58 that is opposite of the reflective interior surface 60. The lid 50 is operable between an open position, wherein the reflective surface 42A of the backing 42 is exposed, and a closed position.

Figure 2:
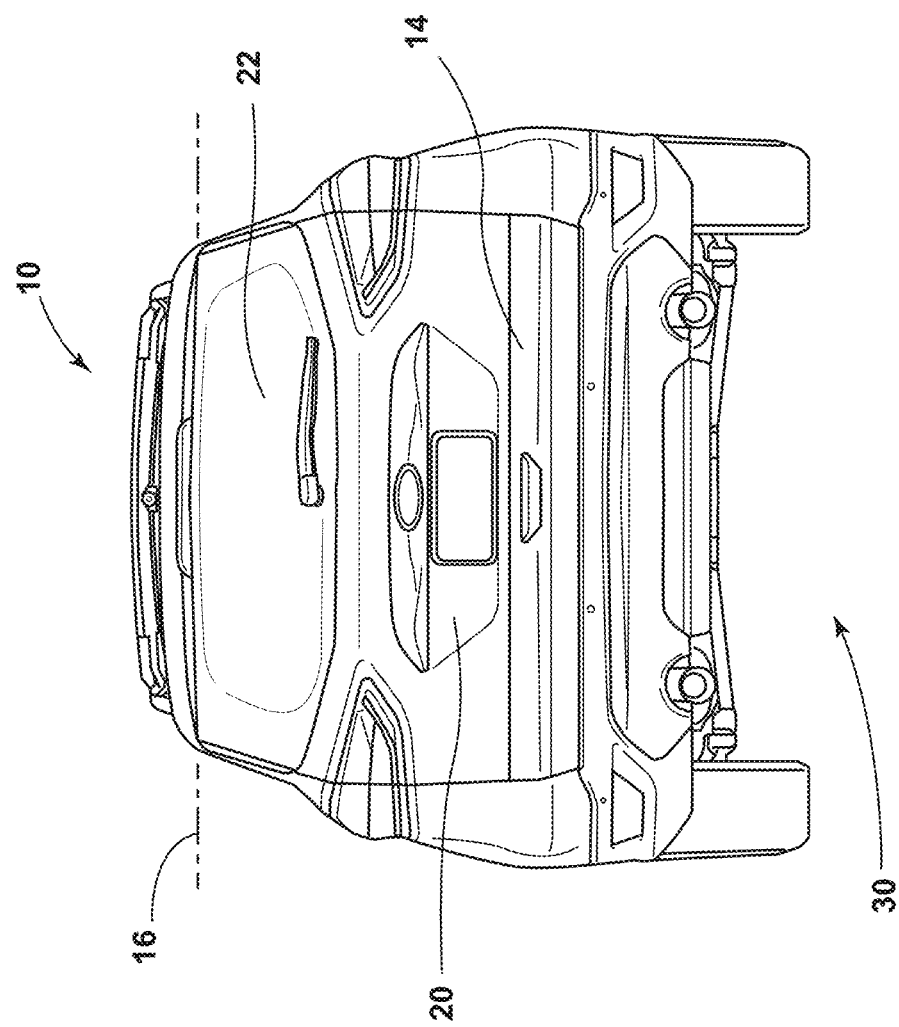
FIG. 2 is a perspective view of the vehicle, illustrating the lift gate in a closed position, according to one embodiment.

Referring now to FIGS. 1 and 2, the vehicle 10 includes a vehicle interior 12. The lift gate 14 is be coupled to the vehicle 10. In some embodiments, the lift gate 14 may be pivotably coupled to the vehicle 10 proximate a rear side of the vehicle 10. The lift gate 14 may be operable to pivot about a lift gate pivot axis 16 between an open position, as shown in FIG. 1, and a closed position, as shown in FIG. 2. Moving the lift gate 14 from the closed position to the open position may provide access to the vehicle interior 12. As shown in FIG. 1, the lift gate pivot axis 16 may extend in a generally vehicle-lateral direction. In other words, the lift gate pivot axis 16 may extend in a direction that is about perpendicular to a vehicle-upward direction and about perpendicular to a vehicle-forward direction.

The lift gate 14 may include an interior side 18 (shown in FIG. 1) and an exterior side 20 (shown in FIG. 2). In the closed position of the lift gate 14, the interior side 18 may face the vehicle interior 12. In the closed position of the lift gate 14, the exterior side 20 of the lift gate 14 may generally face an area outside and vehicle-rearward of the vehicle 10, as illustrated in FIG. 2. In various embodiments, the lift gate 14 of the vehicle 10 may include a window 22. In some embodiments, one or more trim panels 24 on the interior side 18 of the lift gate 14 may be adjacent to the window 22. For example, as shown in FIG. 1, the window 22 may be at least partially bounded by an upper trim panel 26. The upper trim panel 26 may be disposed between the window 22 and the lift gate pivot axis 16. In some embodiments, in the closed position of the lift gate 14, the upper trim panel 26 may be disposed vehicle-upward of the window 22.

Referring now to FIG. 1, in various embodiments, the vehicle 10 includes a reflective panel 28. As shown in FIG. 1, the reflective panel 28 may be coupled to the lift gate 14 and may be operable to reflect a rear vehicle scene 30 if the lift gate 14 is in the open position. In other words, the reflective panel 28 may be configured with a reflective surface to reflect a mirror image of the vehicle-rearward surroundings of the vehicle 10. In various embodiments, the reflective panel 28 may be an ordinary mirror, such as a silver glass mirror that includes a coating of silver, copper film, and two or more layers of waterproof paint on a back surface of a piece of float glass. It is contemplated that, in various embodiments, the reflective panel 28 may be one or more of a variety of types of mirrors and/or reflective surfaces configured to produce images via reflection. In some embodiments, the reflective panel 28 may be disposed generally vehicle-upward of the window 22 if the lift gate 14 is in the closed position. In some embodiments, the reflective panel 28 may be coupled to the upper trim panel 26, as shown in FIG. 1. In some embodiments, the reflective panel 28 may face generally vehicle-downward if the lift gate 14 is in the closed position. As illustrated in FIG. 1, in some embodiments, the reflective panel 28 may face generally vehicle-rearward if the lift gate 14 is in the open position.

Figure 6B:
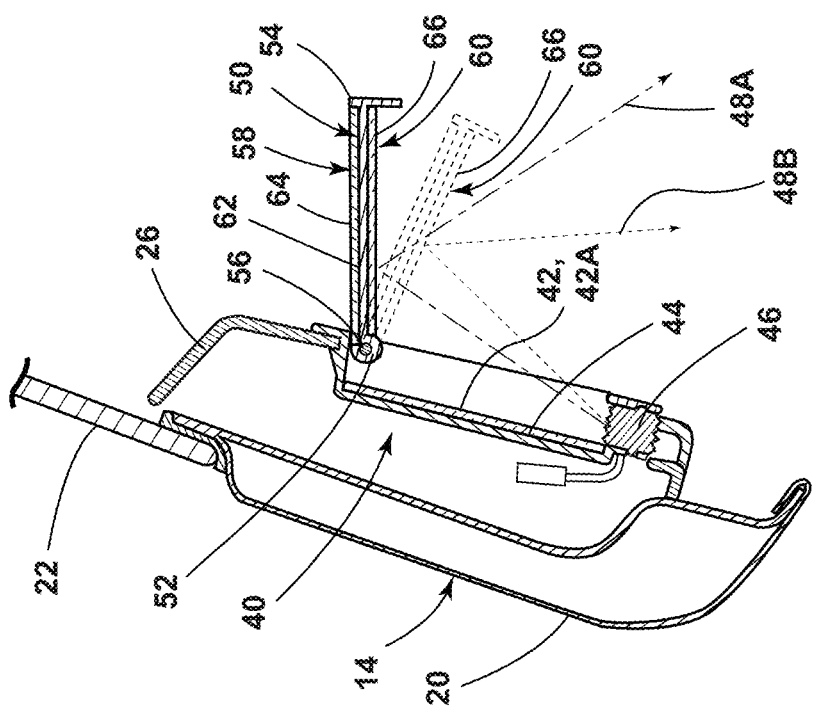
FIG. 6B is a cross-sectional view, taken through line VIB-VIB, of the lamp assembly coupled to the lift gate, illustrating the lid in the open position and a representation of the lid in an intermediate position shown in phantom, according to one embodiment.

Referring now to FIGS. 1 and 3-6B, in various embodiments, the vehicle 10 may include the lamp assembly 32. The lamp assembly 32 may include the housing 34. The housing 34 may be coupled to the vehicle 10. In various embodiments, the housing 34 may be coupled to the lift gate 14. In some embodiments, the housing 34 may be coupled to the interior side 18 of the lift gate 14. In some implementations, the lamp assembly 32 may be disposed vehicle-upward of the window 22 of the lift gate 14 if the lift gate 14 is in the closed position. As illustrated in FIGS. 1, 5A, and 6A, in some examples, the lamp assembly 32 may be coupled to the upper trim panel 26 of the lift gate 14. For example, as shown in FIGS. 5B and 6B, the housing 34 may be nested within a cutout in the upper trim panel 26.

Figure 3:
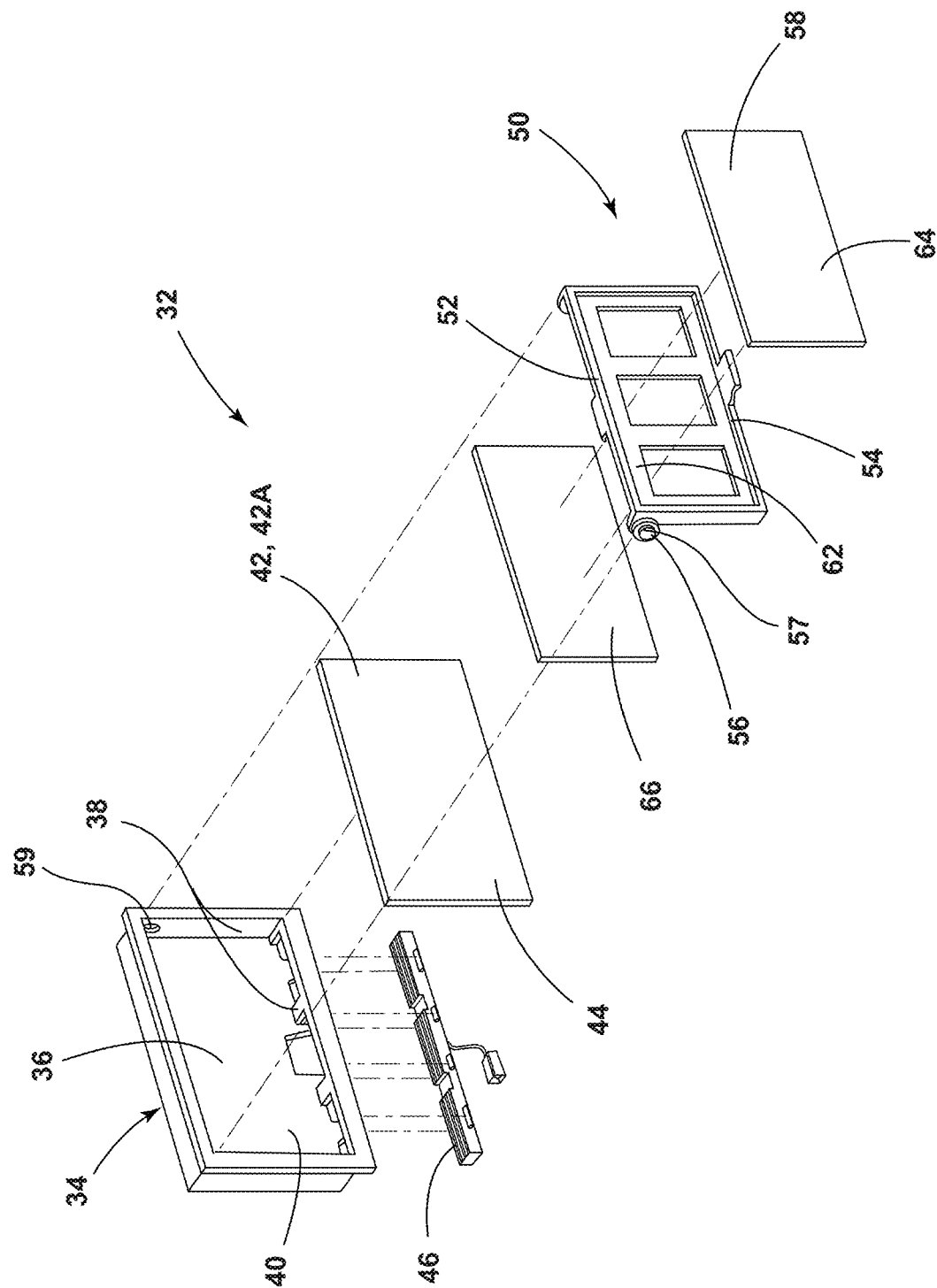
FIG. 3 is an exploded view of the lamp assembly, illustrating a housing, a light source, a backing with a reflective surface, and a lid having a reflective interior surface and a reflective exterior surface, according to one embodiment.
Figure 4B:
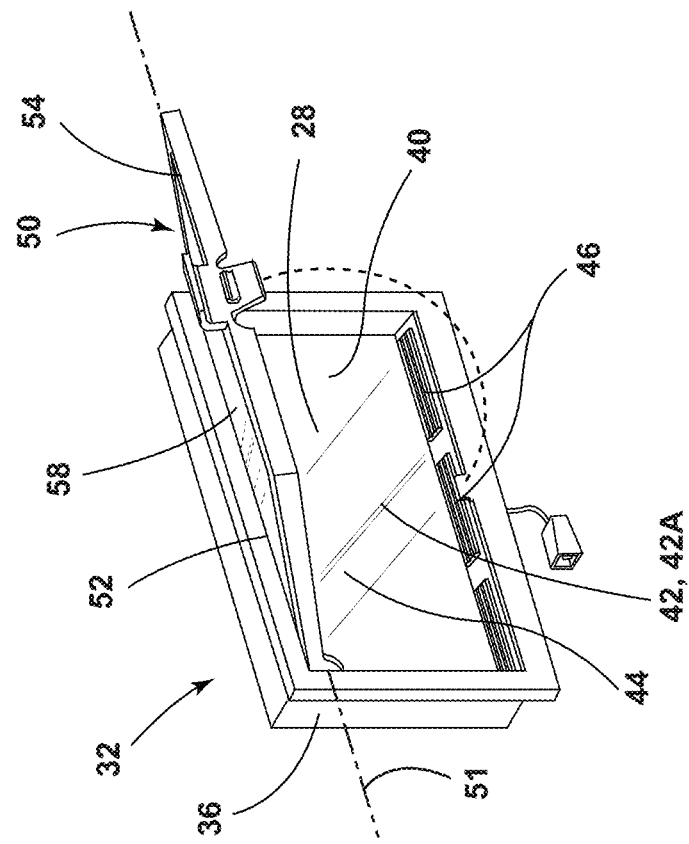
FIG. 4B is a perspective view of the lamp assembly, illustrating the lid in an open position, according to one embodiment.

In various embodiments, the housing 34 may include a back wall 36 and one or more side walls 38 that extend outward from the back wall 36 to define a cavity 40, as illustrated in FIG. 3. The housing 34 may include a backing 42 with a reflective surface 42A. In some embodiments, the backing 42 may be a portion of the housing 34 that is reflective. For example, the back wall 36 may be reflective, such that the back wall 36 of the housing 34 constitutes the backing 42 with the reflective surface 42A. In some embodiments, the backing 42 may be a reflective backing panel 44 that is coupled with the housing 34. For example, as illustrated in FIG. 3, the housing 34 is configured to receive the reflective backing panel 44 within the cavity 40 adjacent the back wall 36, such that the reflective backing panel 44 constitutes the backing 42 of the housing 34. In such embodiments, the backing panel 44 may define the cavity 40 with the one or more side walls 38. As shown in FIG. 4B, the reflective surface 42A of the backing 42 may face the cavity 40. As such, the reflective surface 42A may generally face an opening to the cavity 40 defined by the one or more side walls 38.

In various embodiments, the reflective surface 42A of the backing 42 may be planar. For example, the reflective surface 42A of the backing 42 may be generally, substantially, and/or entirely planar. In such embodiments, the backing 42 may function as a flat mirror in which the angle of reflection is generally the same as the angle of incidence. It is contemplated that, in some embodiments, the reflective surface 42A of the backing 42 may be non-planar. For example, the reflective surface 42A may be convex, such that a fish-eye view reflection results. In various embodiments, the reflective surface 42A of the backing 42 may be configured to produce a reflected image of a scene opposite the reflective surface 42A to be viewed by a user. For example, the reflective surface 42A of the backing 42 may be configured to reflect the rear vehicle scene 30 for a user if the lift gate 14 is in the open position.

Referring still to FIGS. 1 and 3-6B, in various embodiments, the lamp assembly 32 includes the light source 46 that is configured to emit visible light 48. The light source 46 may be coupled to the housing 34. In some embodiments, the light source 46 may be coupled to the housing 34, such that the light source 46 is disposed proximate to a vehicle-downward end of the housing 34 if the lift gate 14 is in the open position, as shown in FIGS. 5A-6B. It is contemplated that the light source 46 may include one or more of a variety of types of lighting devices configured to emit light 48 (e.g., LED, etc.). It is further contemplated that the light source 46 may include a plurality of lighting devices that are each configured to emit light 48, in some embodiments.

Figure 4A:
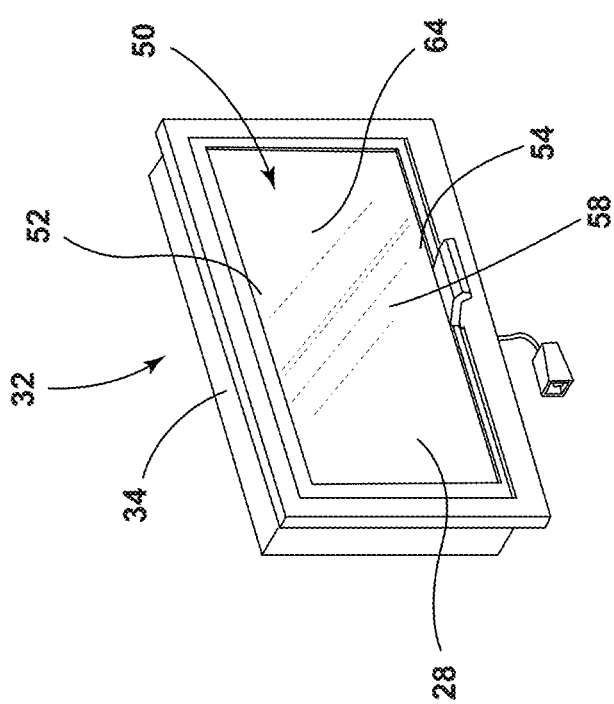
FIG. 4A is a perspective view of the lamp assembly, illustrating the lid in a closed position, according to one embodiment.
Figure 6A:
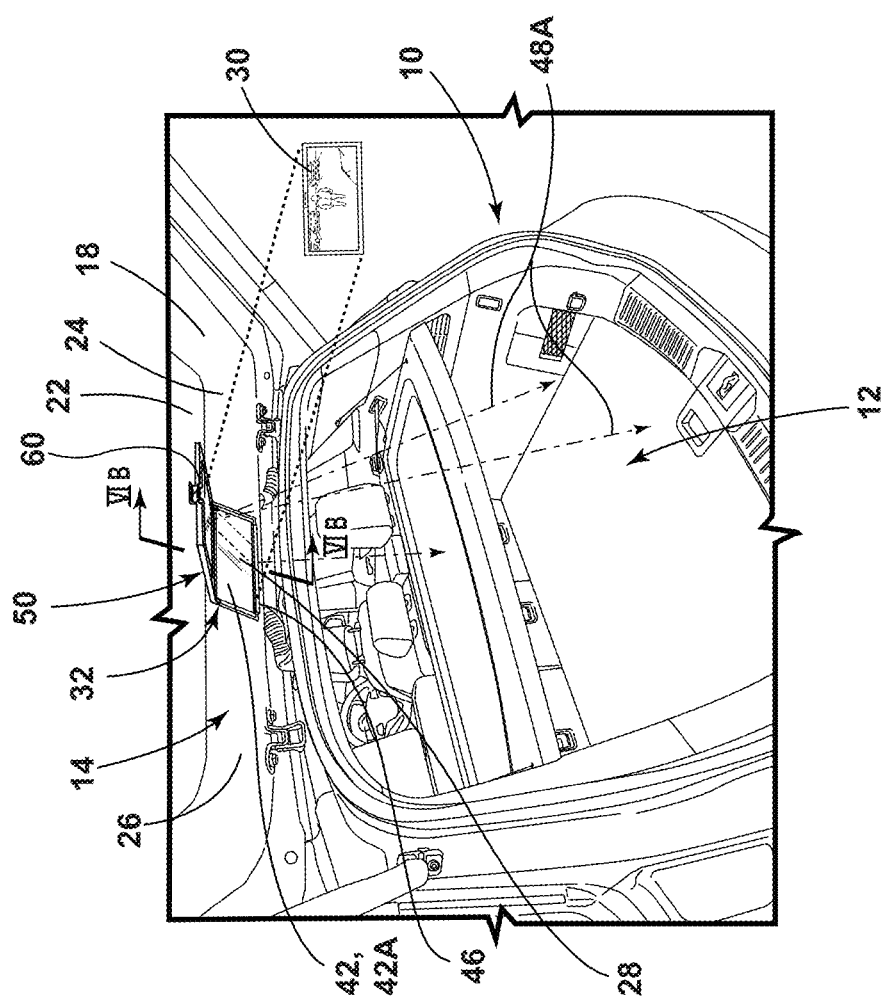
FIG. 6A is a perspective view of the rear portion of the vehicle, illustrating the lamp assembly coupled to the lift gate with the lid in the open position, such that light emitted from the light source is reflected off of the reflective interior surface of the lid and the reflective surface of the backing reflects the rear vehicle scene, according to one embodiment.

In various embodiments, the lamp assembly 32 may include the lid 50. The lid 50 may be operably coupled to the housing 34 and operable to move between the closed position, as shown in FIGS. 4A, 5A, and 5B, and the open position, as shown in FIGS. 4B, 6A, and 6B. As illustrated in FIG. 5B, the lid 50 may cover the reflective surface 42A of the backing 42 while in the closed position. Conversely, the reflective surface 42A of the backing 42 of the lamp assembly 32 may be exposed if the lid 50 is in the open position, as shown in FIGS. 4B, 6A, and 6B.

In various embodiments, the lid 50 may be pivotably coupled to the housing 34 and configured to pivot about a lid pivot axis 51 between the open position and the closed position. In some embodiments, the lid pivot axis 51 may be generally, substantially, and/or entirely parallel to the lift gate pivot axis 16. The lid 50 may extend from a first end 52 to a second end 54. The lid 50 may be pivotably coupled to the housing 34 proximate to the first end 52 of the lid 50 and may extend therefrom to the second end 54 of the lid 50 that is distal from the first end 52. As shown in FIGS. 4A and 5B, the second end 54 of the lid 50 may be proximate to the light source 46 if the lid 50 is in the closed position. In some embodiments, the second end 54 of the lid 50 may be adjacent to the light source 46 in the closed position of the lid 50. In various embodiments, the second end 54 may be closer than the first end 52 to the light source 46 if the lid 50 is in the closed position, and the second end 54 may be further than the first end 52 from the light source 46 if the lid 50 is in the open position. In some embodiments, in the closed position of the lid 50, the second end 54 may be the nearest portion of the lid 50 to the light source 46.

Referring now to FIGS. 1 and 6A, in various embodiments, the reflective surface 42A of the backing 42 of the housing 34 may face generally vehicle-rearward, and may be configured to reflect the rear vehicle scene 30 if the lift gate 14 is in the open position and the lid 50 is in the open position. In various embodiments, the lid 50 may be operable to enter one or more intermediate pivoted positions between the open position and the closed position. For example, a representation of the one or more intermediate pivoted positions is shown in phantom in FIG. 6B.

Referring now to FIGS. 3, 5B, and 6B, in various embodiments, a detent feature 56 may be operably coupled to the lid 50 and may be configured to retain the lid 50 in one or more of a variety of pivoted positions. For example, the detent feature 56 may be configured to retain the lid 50 in the open position, as illustrated in FIG. 6B. In some embodiments, the detent feature 56 may be configured to retain the lid 50 in the one or more intermediate pivoted positions between the open position and the closed position. In an exemplary embodiment illustrated in FIG. 3, the detent feature 56 is a cylindrical protrusion 57 extending outward from the lid 50 proximate the first end 52 of the lid 50. The cylindrical protrusion 57 is configured to matingly-engage with an aperture 59 defined by one of the plurality side walls 38 of the housing 34. The engagement between the cylindrical protrusion 57 and the aperture 59 is relaxed enough that the lid 50 may be pivoted between various positions by a user via rotation of the cylindrical protrusion 57 within the aperture 59. However, enough friction exists between the cylindrical protrusion 57 and the portion of the housing 34 that defines the aperture 59 that the lid 50 is able to be yieldingly retained in various pivoted positions (e.g., the open position, one or more intermediate pivoted positions, etc.) when not being manipulated by the user. It is contemplated that, in various embodiments, the detent feature 56 may include at least one of a variety of features configured to retain the lid 50 in one or more pivoted positions that includes, but is not limited to, a ratcheting feature, a friction detent, a catch, a mechanical stop, and/or a combination thereof.

Referring now to FIGS. 3-6B, the lid 50 may include the reflective exterior surface 58 and/or the reflective interior surface 60 opposite of the reflective exterior surface 58. In some embodiments, the reflective exterior surface 58 may face generally the same direction as the reflective surface 42A of the backing 42 if the lid 50 is in the closed position, as illustrated in FIG. 5B. The reflective exterior surface 58 may be planar. For example, the reflective exterior surface 58 may be generally, substantially, and/or entirely planar. As such, in some embodiments, the reflective exterior may function as a flat mirror, in which the angle of reflection is generally the same as the angle of incidence. In some embodiments, the reflective exterior surface 58 may be generally parallel to the reflective surface 42A of the backing 42 if the lid 50 is in the closed position. In other words, a plane of the reflective surface 42A of the backing 42 may be generally parallel to a plane of the reflective exterior surface 58 if the lid 50 is in the closed position. In various embodiments, the reflective exterior surface 58 may be configured to produce images by reflection for the user to view. In other words, the reflective exterior surface 58 may be configured to function as a mirror for reflecting a scene. It is contemplated that, in some embodiments, the reflective exterior surface 58 may be non-planar. For example, the reflective exterior surface 58 may be convex, such that a fish-eye image is produced via reflection.

In some embodiments, the lid 50, or a portion thereof, may be reflective and, therefore, the exterior side 20 of the lid 50 may constitute the reflective exterior surface 58. In some embodiments, the lid 50 may be an assembly of a variety of components. For example, as shown in FIG. 3, the lid 50 may include a frame 62 and an exterior lid panel 64 that has a reflective surface 42A. In such embodiments, a reflective surface of the exterior lid panel 64 may constitute the reflective exterior surface 58 of the lid 50. It is contemplated that, the reflective exterior surface 58 may be one or more of a variety of surfaces configured to produce an image via reflection. For example, the reflective exterior surface 58 may be an ordinary mirror, such as a silver glass mirror. It is contemplated that the reflective exterior surface 58 may be one or more of a variety of types of mirrors and/or reflective surfaces, in various embodiments.

In various embodiments, the lid 50 may include the reflective interior surface 60 on an opposite side of the lid 50 from the reflective exterior surface 58. In some embodiments, the reflective interior surface 60 may be planar. In other words, the reflective interior surface 60 may be generally, substantially, and/or entirely planar. For example, the reflective interior surface 60 may be configured as a flat mirror surface, such that the angle of incidence is generally equal to the angle of reflection. In some embodiments, the reflective interior surface 60 may be generally parallel to the reflective exterior surface 58. In other words, a plane of the reflective interior surface 60 may be generally parallel to the plane of the reflective exterior surface 58. In some embodiments, the reflective interior surface 60 may be generally parallel to the reflective surface 42A of the backing 42 if the lid 50 is in the closed position. In other words, the plane of the reflective interior surface 60 may be generally parallel to the plane of the reflective surface 42A of the backing 42 if the lid 50 is in the closed position.

In some embodiments, the lid 50, or a portion thereof, may be reflective and, therefore, the interior side 18 of the lid 50 may constitute the reflective interior surface 60. As discussed above, in some embodiments, the lid 50 may include a variety of components. For example, as shown in FIG. 3, the lid 50 includes the frame 62, the exterior lid panel 64 having the reflective exterior surface 58, and an interior lid panel 66 having a reflective surface (reflective surface of the interior lid panel 66 is not shown). In such embodiments, the reflective surface of the interior lid panel 66 may be the reflective interior surface 60 of the lid 50. It is contemplated that, in various examples, the reflective interior surface 60 may be one or more of the variety of types of mirrors and/or reflective surfaces. For example, the reflective interior surface 60 may be a mirror, such as a silver glass mirror.

In various embodiments, the reflective exterior surface 58 of the lid 50 may face generally vehicle-rearward, and may be configured to reflect the rear vehicle scene 30 if the lift gate 14 is in the open position and the lid 50 is in the closed position, as illustrated in FIG. 5A. In some embodiments, the reflective surface 42A of the backing 42 may be configured to face generally vehicle-rearward and reflect the rear vehicle scene 30 if the lift gate 14 is in the open position and the lid 50 is in the open position, as illustrated in FIG. 6A. In some embodiments, the reflective interior surface 60 of the lid 50 may face the reflective surface 42A of the backing 42 in the closed position of the lid 50, as shown in FIG. 5B.

Referring now to FIGS. 5A-6B, in various embodiments, the reflective interior surface 60 of the lid 50 may be configured to reflect the light 48 emitted from the light source 46. In some embodiments, the reflective interior surface 60 of the lid 50 may be configured to reflect the light 48 emitted from the light source 46 generally vehicle-downward and/or generally vehicle-rearward. For example, as illustrated in FIGS. 6A and 6B, the lamp assembly 32 is coupled to the upper trim panel 26 of the lift gate 14, which is in the open position, such that the light source 46 of the lamp assembly 32 is disposed at the vehicle-downward end of the lamp assembly 32 and is configured to emit light 48 in the generally vehicle-upward direction. The emitted light 48 is reflected off of the reflective interior surface 60 of the open lid 50 in the vehicle-downward direction and/or the vehicle-rearward direction. In such embodiments, the reflected light 48 may generally illuminate the rear vehicle scene 30 that is reflected in the reflective surface 42A of the exposed backing 42 of the lamp assembly 32.

In further reference to FIGS. 6A and 6B, in some embodiments, the reflective interior surface 60 may be configured to reflect light 48 emitted from the light source 46 in different directions based on the position of the lid 50. For example, the reflective interior surface 60 may be configured to reflect light 48 in a first direction if the lid 50 is in an intermediate pivoted position, and the reflective interior surface 60 may be configured to reflect the emitted light 48 in a second direction if the lid 50 is in the open position. In the embodiment illustrated in FIG. 6B, the lamp assembly 32 is coupled to the upper trim panel 26 of the lift gate 14, which is in the open position. In the intermediate pivoted position of the lid 50 (illustrated in phantom), the reflective interior surface 60 of the lid 50 is configured to reflect the light 48 emitted from the light source 46 in a first direction. In the open position of the lid 50 (illustrated in solid lines), the reflective interior surface 60 of the lid 50 is configured to reflect the light 48 emitted from the light source 46 in a second direction that is vehicle-rearward of the first direction. It is contemplated that, in some embodiments, the first direction and/or the second direction may not be vehicle-rearward directions (i.e., the first direction and/or the second direction may be, for example, vehicle-downward, vehicle-forward, and/or a combination thereof). In such embodiments, it will be understood that the second direction may be vehicle-rearward of the first direction, in that the second direction is directed more vehicle-rearward (or less vehicle-forward) than the first direction. In embodiments where the lid 50 is adjustable between various pivoted positions, adjustment of the pivoted position of the lid 50 by the user may allow the user to focus the reflected light 48 in a desired direction to illuminate a desired area of the vehicle 10 and/or outside of the vehicle 10.

It is contemplated that, in some embodiments, the reflective panel 28 may be a component of the lamp assembly 32. For example, in some embodiments, the reflective panel 28 may be the backing 42 of the lamp assembly 32 and may be configured to reflect the rear vehicle scene 30 if the lid 50 is in the open position and the lift gate 14 is in the open position. In some embodiments, the reflective panel 28 may be the reflective exterior surface 58 of the lid 50, and the reflective panel 28 may, thus, be configured to reflect the rear vehicle scene 30 if the lift gate 14 is in the open position and the lid 50 is in the closed position. It is contemplated that the vehicle 10 and/or the lamp assembly 32 may include a plurality of reflective panels 28, in some embodiments.

In operation of an exemplary embodiment of the vehicle 10, a user may approach and open the lift gate 14 of the vehicle 10 to retrieve an item stored in a cargo area of the vehicle interior 12 in low-light conditions, such as at night. When the lift gate 14 is opened, the lamp assembly 32, which is coupled to the upper trim panel 26 of the interior side 18 of the lift gate 14, pivots with the lift gate 14 such that the reflective exterior surface 58 of the closed lid 50 faces generally vehicle-rearward. The user then pivots the lid 50 of the lamp assembly 32 from the closed position to the open position, such that light 48 emitted from the light source 46 is reflected off of the reflective interior surface 60 of the lid 50 in generally vehicle-rearward and vehicle-downward directions, which illuminates the rear vehicle scene 30. In the open position of the lid 50, the reflective surface 42A of the backing 42 of the lamp assembly 32 is exposed and reflects the illuminated rear vehicle scene 30, such that the user may reference the image produced on the reflective surface 42A of the backing 42 to monitor the user's rearward surroundings while facing vehicle-forward toward the cargo area. Upon desiring increased illumination in the cargo area of the vehicle interior 12, the user may pivot the lid 50 from the open position to one or more of the intermediate pivoted positions. The lid 50 is retained in the intermediate pivoted position by the detent feature 56. The lid 50 reflects the light 48 emitted from the light source 46 in a more vehicle-forward direction while in the intermediate pivoted position, relative to the open position, which better illuminates the vehicle interior 12 to aid the user in locating the desired object disposed within the cargo area of the vehicle 10. After retrieving the object, the user may close the lid 50 of the lamp assembly 32 and close the lift gate 14.

The present disclosure may provide a variety of advantages. First, the vehicle-rearward-facing reflective surface 42A of the backing 42 and reflective exterior surface 58 of the lid 50 may allow a user to monitor the rear vehicle scene 30 while facing generally vehicle-forward. Second, the lid 50 may aid the user while in the open position and the closed position, because of the functionality of the reflective interior surface 60 and the reflective exterior surface 58 of the lid 50. In the open position of the lid 50, the reflective interior surface 60 of the lid 50 may aid the user by reflecting light 48 emitted from the light source 46 to illuminate the rear vehicle scene 30. In the closed position of the lid 50, the reflective exterior surface 58 may aid the user by providing a mirror to the user for monitoring the rear vehicle scene 30. Third, the adjustability of the lid 50 between the open position, the closed position, and the one or more intermediate pivoted positions allows the user to modify the direction that light 48 emitted from the light source 46 is reflected off of the reflective interior surface 60 of the lid 50, which may aid the user in illuminating a desired portion of the vehicle 10 and/or area outside of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
 a lift gate operable between a closed position and an open position; and
 a lamp assembly, comprising:
  a housing coupled to the lift gate and having a backing with a reflective surface;
  a light source coupled to the housing and configured to emit light; and
  a lid operably coupled to the housing and having a reflective interior surface and a reflective exterior surface opposite the reflective interior surface, the lid being operable between an open position, wherein the reflective surface of the backing is exposed, and a closed position.

2. The vehicle of claim 1, wherein the reflective exterior surface of the lid faces generally vehicle-rearward and is configured to reflect a rear vehicle scene if the lift gate is in the open position and the lid is in the closed position.

3. The vehicle of claim 1, wherein the reflective surface of the backing faces generally vehicle-rearward and is configured to reflect a rear vehicle scene if the lift gate is in the open position and the lid is in the open position.

4. The vehicle of claim 1, wherein the reflective interior surface of the lid faces the reflective surface of the backing if the lid is in the closed position.

5. The vehicle of claim 1, wherein the reflective interior surface of the lid is configured to reflect the light emitted from the light source generally vehicle-downward if the lift gate is in the open position and the lid is in the open position.

6. The vehicle of claim 1, wherein the lid is pivotably coupled to the housing and configured to pivot about a lid pivot axis between the open and closed positions.

7. The vehicle of claim 6, further comprising:
a detent feature operably coupled to the lid and configured to retain the lid in one or more intermediate pivoted positions between the open position and the closed position.

8. The vehicle of claim 7, wherein the reflective interior surface of the lid is configured to reflect the light emitted from the light source in a first direction if the lift gate is in the open position and the lid is in the one or more intermediate pivoted positions, and the reflective interior surface of the lid is configured to reflect the light emitted from the light source in a second direction vehicle-rearward of the first direction if the lift gate is in the open position and the lid is in the open position.

9. The vehicle of claim 1, wherein the lift gate comprises:
an interior side; and
an exterior side opposite the interior side, wherein the lamp assembly is coupled to the interior side of the lift gate.

10. The vehicle of claim 9, wherein the lift gate comprises:
a window, wherein the housing is disposed vehicle-upward of the window if the lift gate is in the closed position.

11. A lamp assembly for a vehicle, comprising:
a housing coupled to the vehicle and having a backing with a reflective surface;
a light source coupled to the housing and configured to emit light; and
a lid operably coupled to the housing and having a reflective interior surface and a reflective exterior surface opposite the reflective interior surface, the lid being operable between an open position, wherein the reflective surface of the backing is exposed, and a closed position.

12. The lamp assembly of claim 11, wherein the lid is pivotably coupled to the housing and configured to pivot about a lid pivot axis between the open and closed positions.

13. The lamp assembly of claim 12, wherein the reflective surface of the backing is planar.

14. The lamp assembly of claim 13, wherein the reflective exterior surface of the lid is planar and the reflective surface of the backing is parallel to the reflective exterior surface of the lid if the lid is in the closed position.

15. The lamp assembly of claim 12, wherein the reflective interior surface of the lid is configured to reflect light emitted from the light source if the lid is in the open position.

16. The lamp assembly of claim 12, wherein the lid is pivotably coupled to the housing proximate a first end of the lid, and the lid extends from the first end to a second end that is distal from the first end, wherein the second end is proximate to the light source in the closed position of the lid.

17. A vehicle, comprising:
a lift gate operable between a closed position and an open position; and
a reflective panel coupled to the lift gate and operable to reflect a rear vehicle scene if the lift gate is in the open position.

18. The vehicle of claim 17, wherein the lift gate comprises:
a window, wherein the reflective panel is disposed vehicle-upward of the window if the lift gate is in the closed position.

19. The vehicle of claim 17, wherein the reflective panel is operable to pivot relative to the lift gate.

* * * * *